United States Patent [19]

Deem et al.

[11] 4,068,902
[45] Jan. 17, 1978

[54] ADAPTIVE BRAKING MODULATOR WITH ELECTRICALLY ACTIVATED RELAY VALVE

[75] Inventors: Brian Charles Deem; Marc Alan Karon, both of Elyria, Ohio

[73] Assignee: The Bendix Corporation, South Bend, Ind.

[21] Appl. No.: 742,152

[22] Filed: Nov. 15, 1976

[51] Int. Cl.² .......................... B60T 8/02; B60T 13/66
[52] U.S. Cl. ................................. 303/28; 137/627.5; 303/69; 303/118
[58] Field of Search ....................... 303/15, 28, 40, 29, 303/30, 68–69, 118, 119, 61; 188/181 A; 137/627.5; 251/30

[56] References Cited

U.S. PATENT DOCUMENTS

| 2,706,487 | 4/1955 | Wilson | 303/69 X |
| 2,718,897 | 9/1955 | Andrews | 303/69 |
| 3,309,149 | 3/1967 | Bueler | 303/68 X |
| 3,881,779 | 5/1975 | Machek | 303/118 |
| 3,902,764 | 9/1975 | Sebo | 303/118 |
| 3,936,097 | 2/1976 | Yanagawa et al. | 303/40 X |
| 3,945,401 | 3/1976 | Greenwood | 137/627.5 |

FOREIGN PATENT DOCUMENTS 1,144,135   2/1963   Germany ................................ 303/40

Primary Examiner—Trygve M. Blix
Assistant Examiner—Douglas C. Butler

Attorney, Agent, or Firm—Ken C. Decker; William N. Antonis

[57] ABSTRACT

An electrically actuated relay valve or adaptive braking modulator for a vehicle fluid pressure braking system includes a housing having a fluid pressure inlet, a pair of vents communicating with the ambient atmosphere, and a brake application effecting mechanism. The inlet communicates with a chamber defined within the modulator, and this chamber is in turn communicated to the brake application effecting mechanism. An electrically actuated valve controls communication from the inlet into the chamber, and is shiftable from a first condition permitting substantially uninhibited communication from the inlet to the chamber to a second condition communicating the chamber to one of the vents when an incipient skidding condition is detected. A pressure differential responsive valve element controls communication between the chamber, the brake application effecting mechanism, and the other vent. When the pressure level in the brake application effecting mechanism is greater than the pressure level in the chamber, the pressure differential responsive valve element communicates the brake application effecting mechanism to the other vent. However, when the electrically actuated valve is not actuated during normal braking, the pressure differential responsive valve element prevents communication to the other vent and permits uninhibited communication between the chamber and the brake application effecting mechanism. This arrangement substantially improves the response time of the adaptive braking modulator.

17 Claims, 4 Drawing Figures

ADAPTIVE BRAKING MODULATOR WITH ELECTRICALLY ACTIVATED RELAY VALVE

BACKGROUND OF THE INVENTION

This invention relates to an electrically actuated relay valve or adaptive braking modulator for a vehicle fluid pressure braking system.

Recent governmental regulations require that all vehicles equipped with air brake systems be equipped with adaptive braking system to control the vehicle brakes automatically when an incipient skidding condition is present. These types of adaptive braking system require a modulator or electrically actuated relay valve which is responsive to the output of an electronic control unit that is capable of sensing an incipient skidding condition to effect a brake pressure reduction. The modulator must be capable of quickly responding to the output signal of the control unit to effect the brake pressure control.

SUMMARY OF THE INVENTION

The electrically actuated relay valve or adaptive braking modulator disclosed in the present application substantially improves the response time of prior art modulators by using several unique concepts. For example, the relay valve or modulator includes a primary piston. The volume on top of the primary piston is minimized, to thereby minimize the time lag inherent in the response of mechanical components to pressure changes. For similar reasons, the volume of the secondary chamber on the other side of the primary piston has also been substantially reduced. Furthermore, a pressure differential responsive control valve member controls communication between the relay valve, the inlet port communicated to the pressure source, and a vent, so that the air volume in the primary section of the relay valve is communicated directly to the vent when the solenoid controlling the relay valve is actuated, to thereby insure a quick release of braking pressure.

Therefore, an important object of our invention is to substantially reduce the response time of prior art electrically actuated relay valves and adaptive braking modulators.

Another important object of our invention is to provide an adaptive braking modulator or electrically actuated relay valve in which the volumes of the primary and secondary chambers of the relay valve are minimized.

Still another important object of our invention is to provide an adaptive braking modulator which includes a pressure differential responsive valve which communicates the primary section of the relay valve directly to a vent when the solenoid controlling the valve is actuated to thereby minimize the time required to effect a brake pressure reduction.

DETAILED DESCRIPTION OF THE PREFERRED EMBODIMENT

Figure 1:
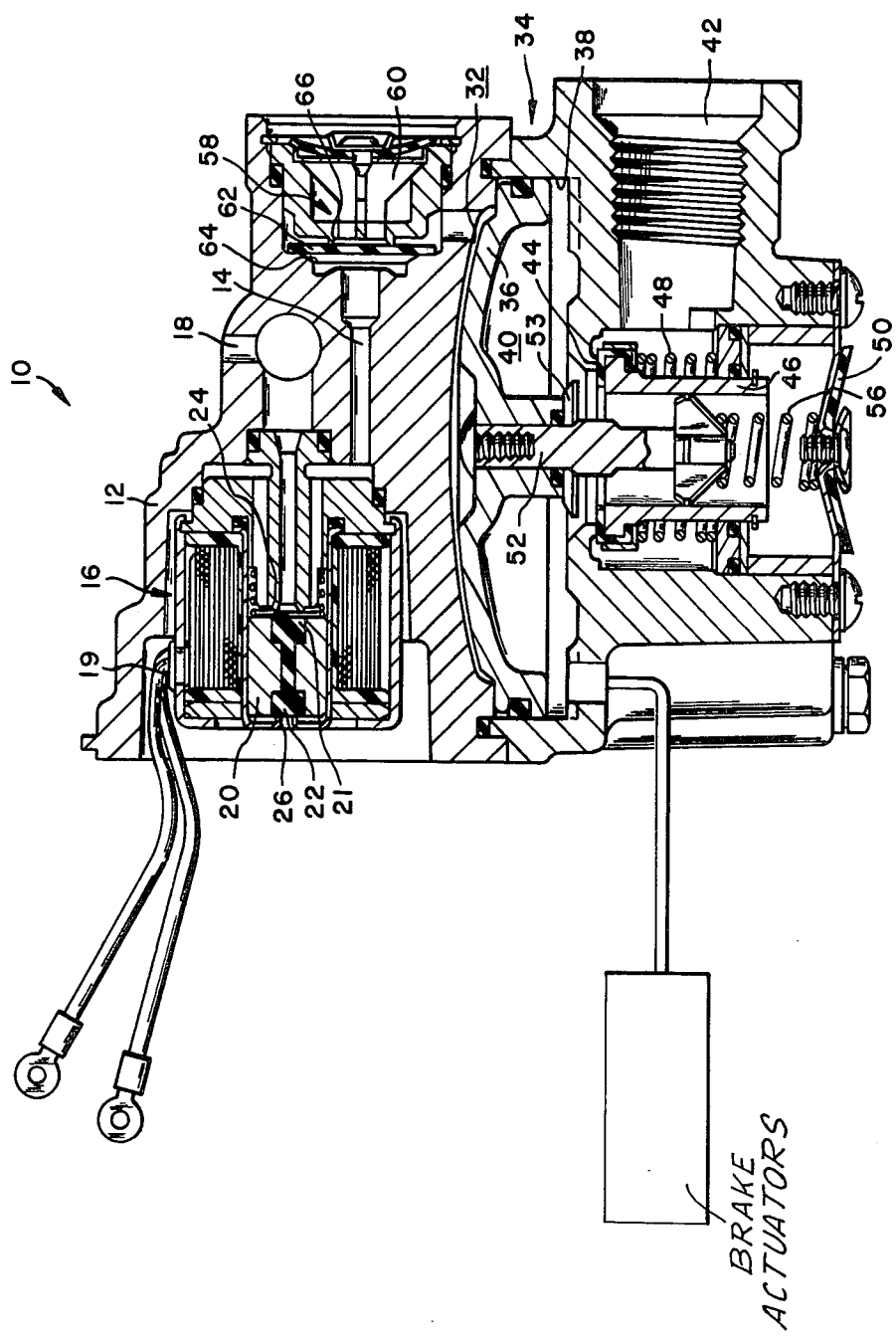
FIG. 1 is a cross-sectional view of an electrically actuated relay valve or adaptive braking modulator made pursuant to the teachings of our present invention.

Referring now to the drawings, an electrically actuated relay valve which can be used as an adaptive braking modulator is generally indicated by the numeral 10 and includes a housing 12 defining a chamber 14 therewithin. An electrically actuated solenoid mechanism generally indicated by the numeral 16 controls communication from an inlet port 18 into the chamber 14. The inlet port 18 is communicated to a vehicle fluid pressure source in the normal manner well known to those skilled in the art. When a brake application is effected, the conventional brake valve (not shown), which is operated by the vehicle operator, is actuated to communicate a relatively high pressure level to the inlet port 18. The solenoid valve 16 includes a solenoid coil 19 and an armature 20 which carries valve elements 21, 22 and which is slidably mounted within the coil 19 so that valve element 21 cooperates with a first valve seat 24 and valve element 22 cooperates with a second valve seat 26. Valve element 21 and valve seat 24 control communication between the inlet port 18 and the chamber 14, and valve element 22 and valve seat 26 control communication between chamber 14 and the atmosphere. A spring yieldably urges the valve element 22 into sealing engagement with the valve seat 26. The chamber 14 communicates with the primary chamber 32 of brake application effecting mechanism generally indicated by the numeral 34.

The mechanism 34 includes a primary piston 36 which is slidably mounted within a bore 38 defined within the housing 12. The upper face, viewing FIG. 1, of the primary piston 36 cooperates with the housing 12 to define the primary chamber 32, and the opposite face of the primary piston 36 cooperates with the housing to define secondary chamber 40. The secondary chamber 40 is provided with outlet ports (not shown) which communicate the chamber 40 with the vehicle brake actuators. A supply port 42 is communicated to the vehicle fluid pressure supply, and the secondary chamber 40 communicates with port 42 through a valve seat 44. An annular inlet valve member 46 is urged into sealing engagement with the annular valve seat 44 by a spring 48. When the brakes of the vehicle are released, the secondary chamber 40 is communicated with exhaust port 50 through the annular valve member 46. The piston 36 carries a stem 52 which extends into the annular valve member 46 and carries a member 53 which is slidably engaged with the inner circumferential surface of the annular valve member 46. The engagement of the member 53 with the surface of the annular valve member 46 and the sliding engagement of the outer circumferential surface of the piston 36 with the bore 38 guide the piston for reciprocal movement within the housing 12, but passages are provided in the member 53 to assure communication through the annular valve member 46 to the vent 50. A spring 56 yieldably urges the piston 36 toward the piston illustrated in the drawing.

A pressure differential responsive valve mechanism generally indicated by the numeral 58 is located in the flow path between the chamber 14, the primary chamber 32 of the relay valve 34, and an atmospheric vent 60 which communicates with the ambient atmosphere. The pressure differential responsive valve mechanism 58 includes a resilient disc 62 which is disposed between a pair of valve seats 64, 66 and is adapted to sealingly engage with either of them. The valve seat 64 is located in the fluid flow path between the chamber 14 and the primary chamber 32 of the relay valve 34, and the valve seat 66 is located in the fluid flow path between the primary chamber 32 and the vent 60.

MODE OF OPERATION OF THE PREFERRED EMBODIMENT

Figure 2:
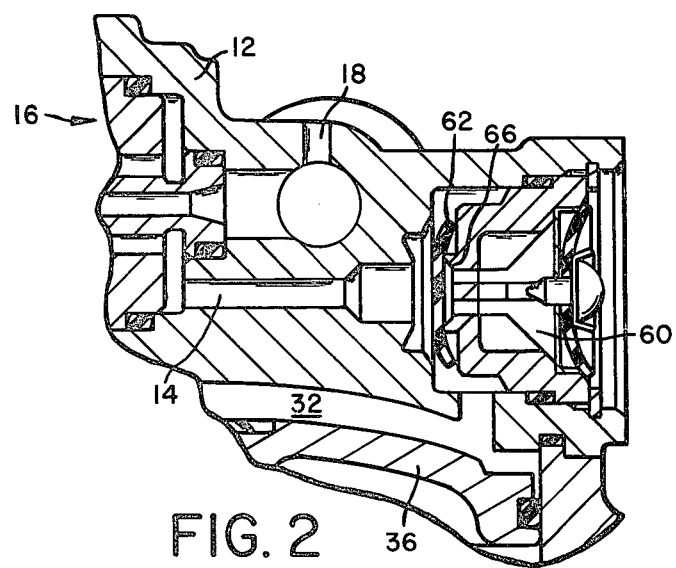
FIG. 2 is a fragmentary cross-sectional view of a portion of the device illustrated in FIG. 1 illustrating the positions of the components thereof during one condition of operation.
Figure 3:
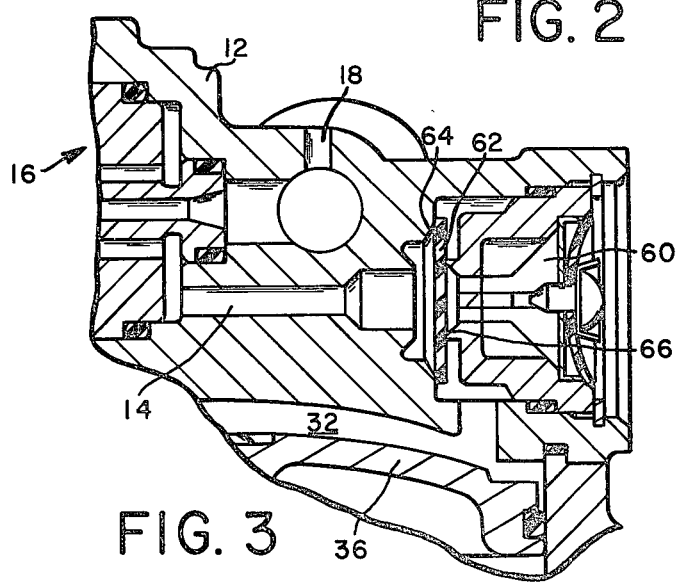
FIG. 3 is a view similar to FIG. 2 but illustrating the components of the device illustrated in FIGS. 1 and 2 in the positions which they assume during another condition of operation.
Figure 4:
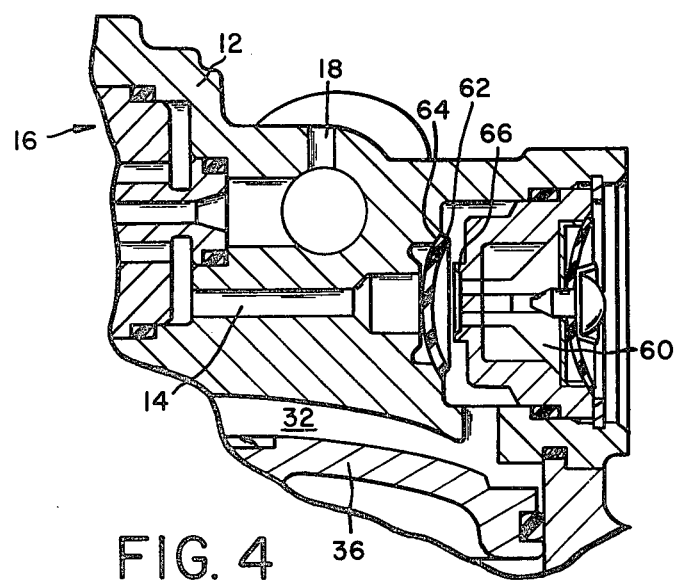
FIG. 4 is a view similar to FIGS. 2 and 3 but illustrating the components of the device illustrated in FIGS. 1-3 in the positions which they assume during still another condition of operation.

The various components of the mechanism 10 are illustrated in FIG. 1 in the positions which they assume when the brakes of the vehicle are released. When a brake application is effected, fluid pressure is communicated to the inlet port 18, and the valve element 22 is urged against the seat 26 by the spring to thereby permit a substantially uninhibited fluid communication from the inlet port 18 to the chamber 14. Since the pressure level in the primary chamber 32 of relay valve 34 is at substantially atmospheric pressure, the valve disc 62 will deflect into the position illustrated in FIG. 2 in which the disc 62 is sealingly engaged with the valve seat 66 to prevent communication from the chamber 14 or from the chamber 32 to the vent 60. As illustrated in FIG. 2, the outer circumferential edge of the disc 62 deflects under the pressure in the chamber 14, to thereby permit communication from the chamber 14 into the primary chamber 32. When the pressure level in the primary chamber 32 increases, the piston 34 moves downwardly viewing FIG. 1, to thereby engage the valve element 53 with the circumferentially extending portion on the upper edge, viewing FIG. 1, of the annular inlet valve 46. When this occurs, communication between the secondary chamber 40 and the vent 50 is terminated. Further downward movement of the piston 36 urges the inlet valve member 46 away from the seat of 44, to thereby communicate the secondary chamber 40 with the supply port 42. Since the secondary chamber 40 is communicated with the vehicle brakes, fluid pressure communicated into the secondary chamber 40 will also be communicated to the vehicle brake actuators, to thereby effect a brake actuation. When the brakes of the vehicle are released, the fluid pressure communicated to the inlet port 18 is exhausted, thereby also exhausting the fluid pressure level in the chamber 14. As the pressure level in the chamber 14 reduces, the valve disc 62 will first move into a lap position when the pressure in the chamber 14 equallizes with the pressure level in the chamber 32. As illustrated in FIG. 3, when this occurs, the outer peripheral edge of the disc 62 becomes sealingly engaged valve seat 64 housing while the inner peripheral portion of the valve 62 remains engaged with the valve seat 66. In this condition, fluid pressure between the chamber 30 14 the chamber 32 is prevented. However, as the pressure level in the chamber 14 continues to drop, the higher pressure level to the right of the valve disc 62 which is communicated to the primary chamber 32 of relay valve 34 forces the disc 62 away from the valve seat 66. In this condition, substantially uninhibited communication is permitted between the primary chamber 32 and the vent 60. Consequently, the fluid pressure level in the chamber 32 will be exhausted in a very short time period, thereby permitting the pressure in chamber 14 to urge the piston 36 to the position illustrated in FIG. 1, thereby effecting release of the vehicle brakes.

When the relay valve 10 is actuated electrically to release a brake application, a signal is transmitted to the solenoid 19 to actuate the armature 20, moving the latter to the right viewing FIG. 1. When this occurs, the valve element 22 is urged out of sealing engagement with the valve seat 26 and the valve element 21 is urged into sealing engagement with the valve seat 24. When this occurs, communication between the inlet port 18 and chamber 14 is terminated, and communication between the chamber 14 and atmosphere through the valve seat 26 is initiated. Therefore, the relatively small volume in the chamber 14 is vented through the valve seat 26 when the solenoid 19 is actuated. When this occurs, the lower pressure level in the chamber 14 and the higher pressure level in the chamber 32 force the valve disc 62 into the position illustrated in FIG. 3 as described hereinabove wherein the valve disc 62 sealingly engages the valve seat 64 to prevent communication between the primary chamber 32 and the chamber 14 and to permit communication between the primary chamber 32 and the vent 60. When this occurs, as described hereinabove, the pressure level in chamber 32 is abruptly reduced, thereby effecting release of the brakes. When the signal transmitted to solenoid 19 terminates, the signal urges the valve element 22 back into sealing engagement with the valve seat 26 and carries valve element 21 out of sealing engagement with the valve seat 24 to thereby again initiate communication between the inlet port 18 and the chamber 14. When this occurs, the pressure in chamber 14 is communicated to the primary chamber 32 to initiate an increase in brake pressure during a brake pressure build cycle.

We claim:

1. In a relay valve for a vehicle compressed air braking system, a housing defining a chamber therewithin, a primary piston slidably mounted in said chamber and dividing the latter into a primary section communicated to a fluid pressure source when a brake application is effected and a secondary section communicated to the brakes of the vehicle, an inlet port communicating said housing with a fluid pressure source, an exhaust port communicating with said housing, and inlet valve means controlling communication between said inlet port, said exhaust port, and said secondary section, said inlet valve means conducting a valve seat between the inlet port and the secondary section, an annular valve member slidable in said housing, means yieldably urging said annular valve member into sealing engagement with the valve seat, said secondary section communicating with said exhaust port through the annular valve member, means carried by said piston for closing communication through said annular valve member and urging the latter away from said valve seat when a brake application is effected, and other means carried by said piston slidably engaging the inner circumferential surface of said annular valve member so that the piston is guided within the housing both by sliding engagement of the piston with said housing and by sliding engagement of said other means with said inner circumferential surface of said annular valve member, said other means cooperating with the inner circumferential surface of the annular valve member to define passages therebetween to permit communication through the annular valve member past the other means.

2. The invention of claim 1; and a stem carried by said piston, said means for closing said annular valve member including a valve element carried by said stem, said stem extending into said annular valve member said other means being carried by said stem.

3. In an electrically actuated relay valve for a vehicle fluid pressure braking system including a fluid pressure source, a housing defining a chamber therewithin, means for communicating said chamber with the fluid pressure source, electrically actuated valve means actuable to vent the fluid pressure content of said chamber, brake application effecting means responsive to fluid pressure from said source to effect a brake application, pressure differential responsive means responsive to the pressure differential between the pressure level in the brake application effecting means and the pressure level in said chamber to vent said brake application effecting means when the pressure level in the brake application effecting means exceeds the pressure level in the chamber.

4. The invention of claim 3:
said housing having a pair of vents, one of said vents communicating with said chamber, the other vent being adapted to communicate with said brake application effecting means, said pressure differential responsive means opening said other vent when the pressure level in the brake application effecting means is greater than the pressure level in the chamber.

5. The invention of claim 4; and
means carried by said housing cooperating with said pressure differential responsive means to prevent communication between said chamber and said brake application effecting means when said other vent is open.

6. The invention of claim 4:
said electrically actuated valve means being shiftable from a first condition communicating said chamber to said pressure source to a second condition terminating communication between said pressure source and said chamber and initiating communication between said chamber and said one vent.

7. The invention of claim 4; and
said pressure differential responsive means including a pair of opposed valve seats and a pressure responsive member located between said seats and adapted to seal against either of said seats, one of said seats communicating said chamber with said brake application effecting means, the other of said seats communicating said brake application effecting means with said other vent.

8. The invention of claim 7:
said valve seats defining a compartment therebetween, said pressure responsive member being a resilient disc located in said compartment.

9. The invention of claim 3:
said brake application effecting means comprising a primary piston controlling communication to the vehicle brakes and an annular inlet valve operated by said primary piston.

10. The invention of claim 9:
said primary piston carrying a stem which extends into said annular inlet valve, and means carried by said stem slidably engaging the inner circumferential surface of said annular inlet valve.

11. In an electrically actuated relay valve for a vehicle fluid pressure braking system including a fluid pressure source:

a housing having an inlet adapted to be connected to the fluid pressure source, a pair of vents, brake application effecting means, and a chamber communicated to said inlet, said vents, and said brake application effecting means;

electrically actuated valve means shiftable from a first condition communicating the chamber with the inlet to a second condition communicating the chamber with one of said vents;

pressure differential responsive means comparing the fluid pressure level in said brake application effecting means with the pressure level in said chamber;

said pressure differential responsive means including means for communicating the chamber with the brake application effecting means and preventing communication from said chamber and said brake application effecting means to the other vent when the pressure level in the chamber is greater than the pressure level in the brake application effecting means;

said pressure differential responsive means including further means preventing communication between the other vent and said chamber and permitting communication between the brake application effecting means and the other vent when the pressure level in the brake application effecting means exceeds the pressure level in the chamber.

12. The invention of claim 11:
said brake application effecting means including a bore defined within said housing, a piston slidably mounted in said bore and cooperating with the latter to define a compartment between one end of the bore, valve means operated by said piston for controlling communication to the brakes of the vehicle, said pressure differential responsive means comparing the fluid pressure level in the compartment with the fluid pressure level in the chamber.

13. The invention of claim 12:
said valve means including a valve seat and an annular valve member yieldably urged against said seat, said piston carrying a stem, said stem extending into said annular valve member and slidably engaging the inner circumferential surface thereof to guide the piston, said stem cooperating with the inner circumferential surface of the annular valve member to permit communication through the annular valve member.

14. The invention of claim 13:
said pressure differential responsive means being a resilient disc, said means for communicating the chamber with the brake application effecting means being a first annular valve seat, said further means being a second annular valve seat, said disc being adapted to seal against either of said valve seats when urged against a corresponding one of said valve seats by the pressure differential across the disc.

15. The invention of claim 11:
said valve means including a valve seat and an annular valve member yieldably urged against said seat, said piston carrying a stem, said stem extending into said annular valve member and slidably engaging the inner circumferential surface thereof to guide the piston, said stem cooperating with the inner circumferential surface of the annular valve member to permit communication through the annular valve member.

16. The invention of claim 11:

said pressure differential responsive means communicating the brake application effecting means with said other vent when the electrically actuated valve means communicates the chamber to the one vent.

17. The invention of claim 11:
said pressure differential responsive means closing communication to the other vent and permitting communication between the chamber and the brake application effecting means when the electrically actuated valve means communicates the chamber with said one vent.

* * * * *